Oct. 25, 1966   E. W. GOSSWILLER   3,281,030
VEHICLE ROOF CARRIER
Original Filed June 29, 1964
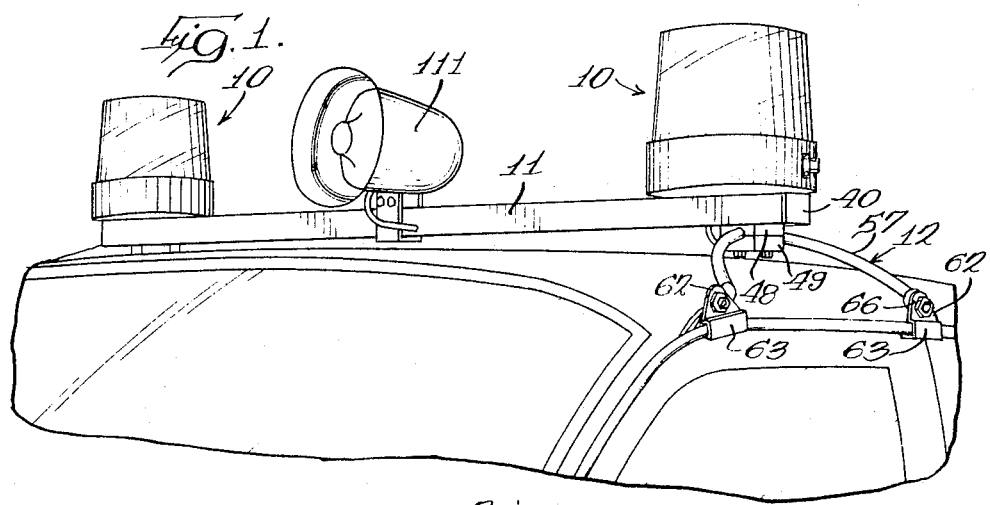
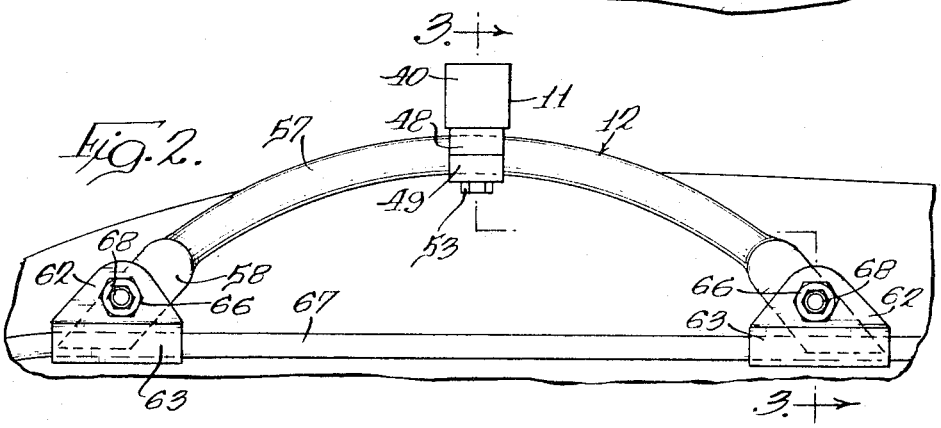
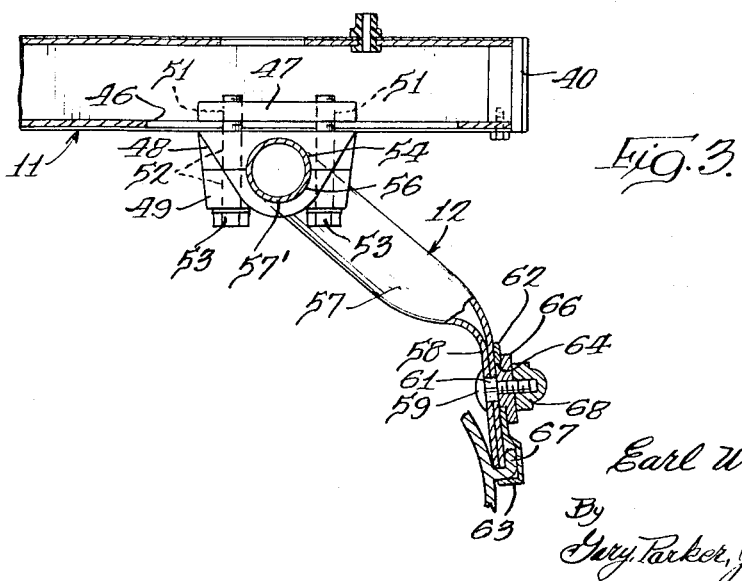
Inventor
Earl W. Gosswiller
By
Gary, Parker, Juettner & Cullinan
Attys

United States Patent Office 3,281,030
Patented Oct. 25, 1966

3,281,030
VEHICLE ROOF CARRIER
Earl W. Gosswiller, Chicago, Ill., assignor to Federal Sign and Signal Corporation, Blue Island, Ill., a corporation of New York
Original application June 29, 1964, Ser. No. 378,754. Divided and this application Dec. 17, 1965, Ser. No. 514,464
10 Claims. (Cl. 224—42.1)

This application is a division of application Serial No. 378,754, filed June 29, 1964.

The present invention relates to an improved carrier, particularly a carrier for rotating signal lights of the type used on police, fire and emergency vehicles, that is adapted to be secured readily to the roof of such vehicles.

The object of the invention is to provide an improved carrier and improved attaching means for securing the carrier to a vehicle roof, which attaching means is universally adjustable relative to the vehicle roof whereby the apparatus carried thereby, such as emergency signalling apparatus, may be easily and detachably secured to vehicle roofs of a wide variety of conformations.

In order to acquaint those skilled in the art with the manner of making and using my improved carrier, I shall describe, in connection with the accompanying drawings, a preferred embodiment of the carrier and the preferred manners of making and using the same.

In the drawings:

FIGURE 1 is a perspective view illustrating emergency warning apparatus attached to the roof of an automobile by the preferred embodiment of the carrier of this invention;

FIGURE 2 is an end elevation of said carrier; and

FIGURE 3 is a fragmentary vertical longitudinal section taken substantially on line 3—3 of FIGURE 2 showing one end portion and bracket of the carrier.

Referring now to the drawings, the apparatus there depicted comprises a pair of spaced rotating emergency lights 10 and a siren 111 carried by a support member or carrier indicated generally at 11. The support member extends transversely of the vehicle roof and is supported adjacent its ends by universal brackets, indicated at 12.

The support bar or carrier 11 for the illustrated units 10 and 111 is preferably of tubular construction, and is illustrated as a square metallic tube. For aesthetic purposes, the tube is covered with a thin sheet 38 of stainless steel or other corrosion resistant and/or decoratively plated material, and the ends thereof are suitably closed by plugs 40. A tubular member is preferred as it facilitates mounting of the units 10 and 111, housing of the electrical leads for said units, and housing of a mechanical interconnection between the two lights 10 (if desired) to synchronize said lights. However, other forms of transverse members may be employed as desired.

To mount the bar 11 quickly, conveniently and securely on a vehicle, the present invention provides an improved bar mounting bracket 12 having capabilities not heretofore realized in the art and affording means for expeditious mounting without requiring any modification to the vehicle.

Referring to FIGURES 2 and 3, the lower wall of the tubular support bar 11 is provided adjacent its ends with a pair of slots 46 by which clamping members are associated with the bar for adjustment longitudinally of the bar and for mounting the brackets 12 on the bar. Since the clamping members and their associated brackets are identical, a description of one will suffice for both. Each clamping member comprises a plate portion 47, and a pair of clamping jaw portions 48 and 49. The plate 47 slidably engages the inner surface of the lower wall of the support member 11 along the sides of the slot 46, and the jaw portion 48 overlaps the outer wall. The plate 47 is provided with tapped holes 51, and the jaw portions 48 and 49 are bored as at 52, for reception of lock bolts 53 which pass loosely through the bores 52 and are threaded into the tapped holes 51. Each of the jaw portions 48 and 49 is formed with a substantially semi-cylindrical groove indicated at 54 and 56, which complement each other to form a cylindrical clamping surface.

The bracket member 12 comprises a generally arcuate tubular member 57 which is of substantially circular cross-section at least at its central portion and is received within the clamping grooves 54 and 56, the same having an outside diameter at least as large as the diameter of the cylinder defined by said grooves.

The tubular member 57 is flattened at each end thereof, as indicated at 58. A stove bolt 59, having a square shank 61, extends through a square opening in each of the flattened portions 58, whereby rotation of the bolt relative to the bracket is prevented. A plate member 62 having a depending hook portion 63 and a circular opening 64 of larger diameter than the threaded portion of the bolt 59 is disposed against the outer surface of each of the flattened portions 58, and a rotary cam 66 having an eccentric circular hub is mounted on each bolt 59. The diameter of the opening 64 and the diameter of the hub of the cam 66 are such that the plate 62 fits snugly but movably over the hub, and the thickness of the plate 62 is greater than the length of the hub of the cam. As is apparent from FIGURE 3, the camming action of the eccentric hub in the circular opening of the plate permits the space between the end of the flattened portion 58 and the hook portion 63 to be opened sufficiently to permit the portion 58 to fit within and the hook portion 63 to engage around the conventional drain gutter 67 of an automobile top, and that such camming action may be used to move the hook portion 63 into clamping engagement with the gutter, whereby each end of the member 57 may be tightly and adjustably secured to the drain gutter of the automobile top. Preferably, the outer flange of the cam is of hexagonal or like form to facilitate adjustment thereof. A lock nut 68 is provided on the outer end of each bolt 59 to secure the respective cam 66 in its desired position.

With the various adjustments provided in the brackets and clamping members, the support member 11 is rendered universally adjustable relative to automobile roofs. Inasmuch as the bolts 53 provide the clamping force between the plate portion 47 and the clamping jaw 48, and between the clamping jaws 48 and 49, it is evident that by loosening the bolts 53 the two clamping assemblies may be moved longitudinally of the bar, i.e., transversely of the vehicle, thereby to accommodate the assembly to vehicles of different widths—from compact cars to fire trucks. Also, with the bolts 53 relatively loose, the arcuate members may be rotated about the axis of the clamping jaw openings 54–56 to adjust the assembly to the roof contour, i.e., the crown or height of the roof relative to its rain gutters. Simultaneously, the tubular members 57 may be moved backward and forward in the jaw members, i.e., longitudinally of the vehicle, to adjust the same to the front-to-rear contour of the roof or the rain gutters. For example, if the rain gutter 67 in FIGURE 2 sloped downwardly to the left rather than being level as shown, the lights 10 would be tilted toward the front rather than remaining upright. To cure such condition, all that would be required would be to relatively shift the bar and its clamps 48–49 rearwardly on the tubular members until the lights were upright. Also, by loosening the gripping hooks 63 from the drain gutter 67 by manipulation of the cam 66, the support member 11 may be moved longitudinally of the gutters, i.e., fore and aft relative to the vehicle. These adjustable features permit the signal lights to be adapted to a wide variety of vehicles having a variety of roof contours, and, in addition, permit the signal lights to be secured to substantially any vehicle roof in the most desirable position from the standpoint of appearance and effectiveness of operation. When so located, the unit may be clamped in position simply by tightening the nuts and the bolts 53.

The four spaced mounting points provided by the brackets assure complete stability of the cross bar or beam, fore and aft, side to side, and up and down. Thus, the two emergency lights 10 and the siren 111 are securely mounted in fixed position and will not shift out of position even at extremely high vehicle speeds. The light and siren are, of course, simply representative of the wide variety of uses to which the carrier structure of the invention may be put, but they serve to illustrate the capability of the carrier for securely mounting apparatus on a single transverse bar. If desired, one or a plurality of the bars may be used on a vehicle for a variety of roof top carrier functions.

While I have shown and described what I regard to be the preferred embodiment of my invention, it will be appreciated that various changes, rearrangements and modifications may be made therein without departing from the scope of my invention, as defined by the appended claims.

I claim:

1. A vehicle roof carrier comprising a support member extending transversely of the vehicle roof and having slots adjacent its ends extending longitudinally of the member, a clamping jaw means slidably mounted in each of said slots for adjustment transversely of the roof, each jaw means including relatively adjustable portions defining an opening transversely of said member, a curved mounting bracket slidably and rotatably mounted adjacent its central portion in each of said jaw means, and means for detachably clamping each jaw means to the respective bracket and said member, each bracket including end portions extending to opposite sides of and below said member for mounting said member above and transversely of the vehicle roof.

2. A carrier as set forth in claim 1 for the roofs of vehicles having drain gutters at the sides, the end portions of each bracket entering within the adjacent drain gutter of the vehicle roof, and hook means on each end of each bracket engaging about the exterior of the drain gutter and clamping the ends of said brackets to the gutters.

3. A carrier as set forth in claim 2, including cam means adjustably mounting each hook on the respective bracket for clamping engagement with and release from the gutter.

4. A carrier as set forth in claim 2, including a stud extending through each end of each bracket, a cam journalled on each stud and including a cam portion eccentric to the stud, the respective hook being mounted on said cam portion for adjustment relative to the end of the bracket to clampingly engage the same with and release the same from the gutter, and a cam and hook locking nut on said stud.

5. A carrier as set forth in claim 1, each jaw means comprising a plate slidably engaging the upper surface of said support member, a first jaw portion slidably engaging the lower surface of said member, a second jaw portion cooperable with said first jaw portion and defining therewith the opening for the respective mounting bracket, and means extending freely through said jaw portions and cooperative with said plate for simultaneously clamping said plate and said first jaw portion to said member and said first and second jaw portions about said bracket.

6. A carrier as set forth in claim 5, said bracket comprising a tube and said first and second jaw means each having a substantially semi-circular recess therein for slidable and rotatable reception of said tube.

7. A carrier as set forth in claim 1, said support member comprising a tube having said slots in the lower wall thereof and receiving said jaw means at least in part in concealed position within said tube.

8. In a vehicle roof carrier having a support extending transversely of the roof and bracket means adjacent each end of said support for mounting the same on the roof, the improvement wherein said bracket means each include a curved portion adjacent said support extending forwardly and rearwardly from said support and clamp means attached to the support for slidably receiving said curved portion for adjustment of said support along the arc of the curved portion in a direction longitudinally of the roof.

9. In a vehicle roof carrier as set forth in claim 8, said clamp means also rotatably receiving said curved portion.

10. In a vehicle roof carrier as set forth in claim 8, at least one of said clamp means being slidably mounted on said support for adjustment longitudinally thereof.

References Cited by the Examiner

UNITED STATES PATENTS 2,596,860   5/1952   McCrory et al. _____ 224—42.1

FOREIGN PATENTS 1,123,398   6/1956   France.
816,952   10/1951   Germany.

GERALD M. FORLENZA, *Primary Examiner.*

F. WERNER, *Assistant Examiner.*